United States Patent [19]

Otaguro

[11] Patent Number: 5,539,685
[45] Date of Patent: Jul. 23, 1996

[54] MULTIPLIER DEVICE WITH OVERFLOW DETECTION FUNCTION

[75] Inventor: Yukio Otaguro, Kanagawa-ken, Japan

[73] Assignee: Kabushiki Kaisha Toshiba, Kawasaki, Japan

[21] Appl. No.: 103,680

[22] Filed: Aug. 10, 1993

[30] Foreign Application Priority Data

Aug. 18, 1992 [JP] Japan .................................. 4-219113

[51] Int. Cl.$^6$ .............................. C06F 7/00; C06F 7/38; C06F 7/52
[52] U.S. Cl. .................... 364/757; 364/715.04; 364/745; 364/759
[58] Field of Search .............................. 364/736, 736.5, 364/737, 745, 754, 757, 758, 759, 760, 715.04

[56] References Cited

U.S. PATENT DOCUMENTS

| | | | |
|---|---|---|---|
| 4,282,581 | 8/1981 | Bondurant et al. ................... | 364/737 |
| 4,700,324 | 10/1987 | Doi et al. ................... | 364/745 |
| 4,811,268 | 3/1989 | Nishitani et al. ................... | 364/745 |
| 5,138,570 | 8/1992 | Argade ................... | 364/760 |

*Primary Examiner*—Tan V. Mai
*Assistant Examiner*—Chuong D. Ngo
*Attorney, Agent, or Firm*—Foley & Lardner

[57] ABSTRACT

A multiplier device with an overflow detection function includes a multiplier register, a multiplicand register, a priority encoder, a shifter for shifting the output from the multiplicand register, in a specified direction according to a value output by the priority encoder, an addition result register for storing a result of an addition, an adder for adding the output from the shifter to the output from the addition result register, a mask pattern generator for outputting a predetermined mask pattern from a bit pattern output from the priority encoder, a logical product circuit for performing an AND operation on the mask pattern output from the mask pattern generator and the value output from the multiplicand register; and a OR circuit for performing an OR operation between the output from the logical product circuit and a carry component output from the adder.

14 Claims, 17 Drawing Sheets

FIG.5

| INPUT | OUTPUT |
|---|---|
| 00000 | 01111111111111111111111111111111 |
| 00001 | 10111111111111111111111111111111 |
| 00010 | 11011111111111111111111111111111 |
| 00011 | 11101111111111111111111111111111 |
| 00100 | 11110111111111111111111111111111 |
| 00101 | 11111011111111111111111111111111 |
| 00110 | 11111101111111111111111111111111 |
| 00111 | 11111110111111111111111111111111 |
| 01000 | 11111111011111111111111111111111 |
| 01001 | 11111111101111111111111111111111 |
| 01010 | 11111111110111111111111111111111 |
| 01011 | 11111111111011111111111111111111 |
| 01100 | 11111111111101111111111111111111 |
| 01101 | 11111111111110111111111111111111 |
| 01110 | 11111111111111011111111111111111 |
| 01111 | 11111111111111101111111111111111 |
| 10000 | 11111111111111110111111111111111 |
| 10001 | 11111111111111111011111111111111 |
| 10010 | 11111111111111111101111111111111 |
| 10011 | 11111111111111111110111111111111 |
| 10100 | 11111111111111111111011111111111 |
| 10101 | 11111111111111111111101111111111 |
| 10110 | 11111111111111111111110111111111 |
| 10111 | 11111111111111111111111011111111 |
| 11000 | 11111111111111111111111101111111 |
| 11001 | 11111111111111111111111110111111 |
| 11010 | 11111111111111111111111111011111 |
| 11011 | 11111111111111111111111111101111 |
| 11100 | 11111111111111111111111111110111 |
| 11101 | 11111111111111111111111111111011 |
| 11110 | 11111111111111111111111111111101 |
| 11111 | 11111111111111111111111111111110 |

FIG.6

| INPUT | OUTPUT |
|---|---|
| 1XXXXXXXXXXXXXXXXXXXXXXXXXXXXXXX | 11111 |
| 01XXXXXXXXXXXXXXXXXXXXXXXXXXXXXX | 11110 |
| 001XXXXXXXXXXXXXXXXXXXXXXXXXXXXX | 11101 |
| 0001XXXXXXXXXXXXXXXXXXXXXXXXXXXX | 11100 |
| 00001XXXXXXXXXXXXXXXXXXXXXXXXXXX | 11011 |
| 000001XXXXXXXXXXXXXXXXXXXXXXXXXX | 11010 |
| 0000001XXXXXXXXXXXXXXXXXXXXXXXXX | 11001 |
| 00000001XXXXXXXXXXXXXXXXXXXXXXXX | 11000 |
| 000000001XXXXXXXXXXXXXXXXXXXXXXX | 10111 |
| 0000000001XXXXXXXXXXXXXXXXXXXXXX | 10110 |
| 00000000001XXXXXXXXXXXXXXXXXXXXX | 10101 |
| 000000000001XXXXXXXXXXXXXXXXXXXX | 10100 |
| 0000000000001XXXXXXXXXXXXXXXXXXX | 10011 |
| 00000000000001XXXXXXXXXXXXXXXXXX | 10010 |
| 000000000000001XXXXXXXXXXXXXXXXX | 10001 |
| 0000000000000001XXXXXXXXXXXXXXXX | 10000 |
| 00000000000000001XXXXXXXXXXXXXXX | 01111 |
| 000000000000000001XXXXXXXXXXXXXX | 01110 |
| 0000000000000000001XXXXXXXXXXXXX | 01101 |
| 00000000000000000001XXXXXXXXXXXX | 01100 |
| 000000000000000000001XXXXXXXXXXX | 01011 |
| 0000000000000000000001XXXXXXXXXX | 01010 |
| 00000000000000000000001XXXXXXXXX | 01001 |
| 000000000000000000000001XXXXXXXX | 01000 |
| 0000000000000000000000001XXXXXXX | 00111 |
| 00000000000000000000000001XXXXXX | 00110 |
| 000000000000000000000000001XXXXX | 00101 |
| 0000000000000000000000000001XXXX | 00100 |
| 00000000000000000000000000001XXX | 00011 |
| 000000000000000000000000000001XX | 00010 |
| 0000000000000000000000000000001X | 00001 |
| 00000000000000000000000000000001 | 00000 |

FIG.7

| INPUT COUNT | OUTPUT | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 00000 | d00 | d01 | d02 | d03 | d04 | d05 | d06 | d07 | d08 | d09 | d10 | d11 | d12 | d13 | d14 | d15 | d16 | d17 | d18 | d19 | d20 | d21 | d22 | d23 | d24 | d25 | d26 | d27 | d28 | d29 | d30 | d31 |
| 00001 | d01 | d02 | d03 | d04 | d05 | d06 | d07 | d08 | d09 | d10 | d11 | d12 | d13 | d14 | d15 | d16 | d17 | d18 | d19 | d20 | d21 | d22 | d23 | d24 | d25 | d26 | d27 | d28 | d29 | d30 | d31 | 0 |
| 00010 | d02 | d03 | d04 | d05 | d06 | d07 | d08 | d09 | d10 | d11 | d12 | d13 | d14 | d15 | d16 | d17 | d18 | d19 | d20 | d21 | d22 | d23 | d24 | d25 | d26 | d27 | d28 | d29 | d30 | d31 | 0 | 0 |
| 00011 | d03 | d04 | d05 | d06 | d07 | d08 | d09 | d10 | d11 | d12 | d13 | d14 | d15 | d16 | d17 | d18 | d19 | d20 | d21 | d22 | d23 | d24 | d25 | d26 | d27 | d28 | d29 | d30 | d31 | 0 | 0 | 0 |
| 00100 | d04 | d05 | d06 | d07 | d08 | d09 | d10 | d11 | d12 | d13 | d14 | d15 | d16 | d17 | d18 | d19 | d20 | d21 | d22 | d23 | d24 | d25 | d26 | d27 | d28 | d29 | d30 | d31 | 0 | 0 | 0 | 0 |
| 00101 | d05 | d06 | d07 | d08 | d09 | d10 | d11 | d12 | d13 | d14 | d15 | d16 | d17 | d18 | d19 | d20 | d21 | d22 | d23 | d24 | d25 | d26 | d27 | d28 | d29 | d30 | d31 | 0 | 0 | 0 | 0 | 0 |
| 00110 | d06 | d07 | d08 | d09 | d10 | d11 | d12 | d13 | d14 | d15 | d16 | d17 | d18 | d19 | d20 | d21 | d22 | d23 | d24 | d25 | d26 | d27 | d28 | d29 | d30 | d31 | 0 | 0 | 0 | 0 | 0 | 0 |
| 00111 | d07 | d08 | d09 | d10 | d11 | d12 | d13 | d14 | d15 | d16 | d17 | d18 | d19 | d20 | d21 | d22 | d23 | d24 | d25 | d26 | d27 | d28 | d29 | d30 | d31 | 0 | 0 | 0 | 0 | 0 | 0 | 0 |
| 01000 | d08 | d09 | d10 | d11 | d12 | d13 | d14 | d15 | d16 | d17 | d18 | d19 | d20 | d21 | d22 | d23 | d24 | d25 | d26 | d27 | d28 | d29 | d30 | d31 | 0 | 0 | 0 | 0 | 0 | 0 | 0 | 0 |
| 01001 | d09 | d10 | d11 | d12 | d13 | d14 | d15 | d16 | d17 | d18 | d19 | d20 | d21 | d22 | d23 | d24 | d25 | d26 | d27 | d28 | d29 | d30 | d31 | 0 | 0 | 0 | 0 | 0 | 0 | 0 | 0 | 0 |
| 01010 | d10 | d11 | d12 | d13 | d14 | d15 | d16 | d17 | d18 | d19 | d20 | d21 | d22 | d23 | d24 | d25 | d26 | d27 | d28 | d29 | d30 | d31 | 0 | 0 | 0 | 0 | 0 | 0 | 0 | 0 | 0 | 0 |
| 01011 | d11 | d12 | d13 | d14 | d15 | d16 | d17 | d18 | d19 | d20 | d21 | d22 | d23 | d24 | d25 | d26 | d27 | d28 | d29 | d30 | d31 | 0 | 0 | 0 | 0 | 0 | 0 | 0 | 0 | 0 | 0 | 0 |
| 01100 | d12 | d13 | d14 | d15 | d16 | d17 | d18 | d19 | d20 | d21 | d22 | d23 | d24 | d25 | d26 | d27 | d28 | d29 | d30 | d31 | 0 | 0 | 0 | 0 | 0 | 0 | 0 | 0 | 0 | 0 | 0 | 0 |
| 01101 | d13 | d14 | d15 | d16 | d17 | d18 | d19 | d20 | d21 | d22 | d23 | d24 | d25 | d26 | d27 | d28 | d29 | d30 | d31 | 0 | 0 | 0 | 0 | 0 | 0 | 0 | 0 | 0 | 0 | 0 | 0 | 0 |
| 01110 | d14 | d15 | d16 | d17 | d18 | d19 | d20 | d21 | d22 | d23 | d24 | d25 | d26 | d27 | d28 | d29 | d30 | d31 | 0 | 0 | 0 | 0 | 0 | 0 | 0 | 0 | 0 | 0 | 0 | 0 | 0 | 0 |
| 01111 | d15 | d16 | d17 | d18 | d19 | d20 | d21 | d22 | d23 | d24 | d25 | d26 | d27 | d28 | d29 | d30 | d31 | 0 | 0 | 0 | 0 | 0 | 0 | 0 | 0 | 0 | 0 | 0 | 0 | 0 | 0 | 0 |
| 10000 | d16 | d17 | d18 | d19 | d20 | d21 | d22 | d23 | d24 | d25 | d26 | d27 | d28 | d29 | d30 | d31 | 0 | 0 | 0 | 0 | 0 | 0 | 0 | 0 | 0 | 0 | 0 | 0 | 0 | 0 | 0 | 0 |
| 10001 | d17 | d18 | d19 | d20 | d21 | d22 | d23 | d24 | d25 | d26 | d27 | d28 | d29 | d30 | d31 | 0 | 0 | 0 | 0 | 0 | 0 | 0 | 0 | 0 | 0 | 0 | 0 | 0 | 0 | 0 | 0 | 0 |
| 10010 | d18 | d19 | d20 | d21 | d22 | d23 | d24 | d25 | d26 | d27 | d28 | d29 | d30 | d31 | 0 | 0 | 0 | 0 | 0 | 0 | 0 | 0 | 0 | 0 | 0 | 0 | 0 | 0 | 0 | 0 | 0 | 0 |
| 10011 | d19 | d20 | d21 | d22 | d23 | d24 | d25 | d26 | d27 | d28 | d29 | d30 | d31 | 0 | 0 | 0 | 0 | 0 | 0 | 0 | 0 | 0 | 0 | 0 | 0 | 0 | 0 | 0 | 0 | 0 | 0 | 0 |
| 10100 | d20 | d21 | d22 | d23 | d24 | d25 | d26 | d27 | d28 | d29 | d30 | d31 | 0 | 0 | 0 | 0 | 0 | 0 | 0 | 0 | 0 | 0 | 0 | 0 | 0 | 0 | 0 | 0 | 0 | 0 | 0 | 0 |
| 10101 | d21 | d22 | d23 | d24 | d25 | d26 | d27 | d28 | d29 | d30 | d31 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10110 | d22 | d23 | d24 | d25 | d26 | d27 | d28 | d29 | d30 | d31 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10111 | d23 | d24 | d25 | d26 | d27 | d28 | d29 | d30 | d31 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11000 | d24 | d25 | d26 | d27 | d28 | d29 | d30 | d31 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11001 | d25 | d26 | d27 | d28 | d29 | d30 | d31 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11010 | d26 | d27 | d28 | d29 | d30 | d31 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11011 | d27 | d28 | d29 | d30 | d31 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11100 | d28 | d29 | d30 | d31 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11101 | d29 | d30 | d31 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11110 | d30 | d31 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11111 | d31 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

INPUT: d00 d01 d02 d03 d04 d05 d06 d07 d08 d09 d10 d11 d12 d13 d14 d15 d16 d17 d18 d19 d20 d21 d22 d23 d24 d25 d26 d27 d28 d29 d30 d31

FIG.8
FIG.8A PRIOR ART

FIG.8A | FIG.8B (Figure showing partial product array for multiplication, with rows of a00, a01, ... a31 shifted across columns, and "UPPER-ORDER 32 BITS OF MULTIPLICATION RESULT" label on the right)

| a00 a01 a02 a03 a04 a05 a06 a07 a08 a09 a10 a11 a12 a13 a14 a15 a16 a17 a18 a19 a20 a21 a22 a23 a24 a25 a26 a27 a28 a29 a30 a31 ) * b31 |
| a01 a02 a03 a04 a05 a06 a07 a08 a09 a10 a11 a12 a13 a14 a15 a16 a17 a18 a19 a20 a21 a22 a23 a24 a25 a26 a27 a28 a29 a30 a31 0 ) * b30 |
| a02 a03 a04 a05 a06 a07 a08 a09 a10 a11 a12 a13 a14 a15 a16 a17 a18 a19 a20 a21 a22 a23 a24 a25 a26 a27 a28 a29 a30 a31 0 0 ) * b29 |
| a03 a04 a05 a06 a07 a08 a09 a10 a11 a12 a13 a14 a15 a16 a17 a18 a19 a20 a21 a22 a23 a24 a25 a26 a27 a28 a29 a30 a31 0 0 0 ) * b28 |
| a04 a05 a06 a07 a08 a09 a10 a11 a12 a13 a14 a15 a16 a17 a18 a19 a20 a21 a22 a23 a24 a25 a26 a27 a28 a29 a30 a31 0 0 0 0 ) * b27 |
| a05 a06 a07 a08 a09 a10 a11 a12 a13 a14 a15 a16 a17 a18 a19 a20 a21 a22 a23 a24 a25 a26 a27 a28 a29 a30 a31 0 0 0 0 0 ) * b26 |
| a06 a07 a08 a09 a10 a11 a12 a13 a14 a15 a16 a17 a18 a19 a20 a21 a22 a23 a24 a25 a26 a27 a28 a29 a30 a31 0 0 0 0 0 0 ) * b25 |
| a07 a08 a09 a10 a11 a12 a13 a14 a15 a16 a17 a18 a19 a20 a21 a22 a23 a24 a25 a26 a27 a28 a29 a30 a31 0 0 0 0 0 0 0 ) * b24 |
| a08 a09 a10 a11 a12 a13 a14 a15 a16 a17 a18 a19 a20 a21 a22 a23 a24 a25 a26 a27 a28 a29 a30 a31 0 0 0 0 0 0 0 0 ) * b23 |
| a09 a10 a11 a12 a13 a14 a15 a16 a17 a18 a19 a20 a21 a22 a23 a24 a25 a26 a27 a28 a29 a30 a31 0 0 0 0 0 0 0 0 0 ) * b22 |
| a10 a11 a12 a13 a14 a15 a16 a17 a18 a19 a20 a21 a22 a23 a24 a25 a26 a27 a28 a29 a30 a31 0 0 0 0 0 0 0 0 0 0 ) * b21 |
| a11 a12 a13 a14 a15 a16 a17 a18 a19 a20 a21 a22 a23 a24 a25 a26 a27 a28 a29 a30 a31 0 0 0 0 0 0 0 0 0 0 0 ) * b20 |
| a12 a13 a14 a15 a16 a17 a18 a19 a20 a21 a22 a23 a24 a25 a26 a27 a28 a29 a30 a31 0 0 0 0 0 0 0 0 0 0 0 0 ) * b19 |
| a13 a14 a15 a16 a17 a18 a19 a20 a21 a22 a23 a24 a25 a26 a27 a28 a29 a30 a31 0 0 0 0 0 0 0 0 0 0 0 0 0 ) * b18 |
| a14 a15 a16 a17 a18 a19 a20 a21 a22 a23 a24 a25 a26 a27 a28 a29 a30 a31 0 0 0 0 0 0 0 0 0 0 0 0 0 0 ) * b17 |
| a15 a16 a17 a18 a19 a20 a21 a22 a23 a24 a25 a26 a27 a28 a29 a30 a31 0 0 0 0 0 0 0 0 0 0 0 0 0 0 0 ) * b16 |
| a16 a17 a18 a19 a20 a21 a22 a23 a24 a25 a26 a27 a28 a29 a30 a31 0 0 0 0 0 0 0 0 0 0 0 0 0 0 0 0 ) * b15 |
| a17 a18 a19 a20 a21 a22 a23 a24 a25 a26 a27 a28 a29 a30 a31 0 0 0 0 0 0 0 0 0 0 0 0 0 0 0 0 0 ) * b14 |
| a18 a19 a20 a21 a22 a23 a24 a25 a26 a27 a28 a29 a30 a31 0 0 0 0 0 0 0 0 0 0 0 0 0 0 0 0 0 0 ) * b13 |
| a19 a20 a21 a22 a23 a24 a25 a26 a27 a28 a29 a30 a31 0 0 0 0 0 0 0 0 0 0 0 0 0 0 0 0 0 0 0 ) * b12 |
| a20 a21 a22 a23 a24 a25 a26 a27 a28 a29 a30 a31 0 0 0 0 0 0 0 0 0 0 0 0 0 0 0 0 0 0 0 0 ) * b11 |
| a21 a22 a23 a24 a25 a26 a27 a28 a29 a30 a31 0 0 0 0 0 0 0 0 0 0 0 0 0 0 0 0 0 0 0 0 0 ) * b10 |
| a22 a23 a24 a25 a26 a27 a28 a29 a30 a31 0 0 0 0 0 0 0 0 0 0 0 0 0 0 0 0 0 0 0 0 0 0 ) * b09 |
| a23 a24 a25 a26 a27 a28 a29 a30 a31 0 0 0 0 0 0 0 0 0 0 0 0 0 0 0 0 0 0 0 0 0 0 0 ) * b08 |
| a24 a25 a26 a27 a28 a29 a30 a31 0 0 0 0 0 0 0 0 0 0 0 0 0 0 0 0 0 0 0 0 0 0 0 0 ) * b07 |
| a25 a26 a27 a28 a29 a30 a31 0 0 0 0 0 0 0 0 0 0 0 0 0 0 0 0 0 0 0 0 0 0 0 0 0 ) * b06 |
| a26 a27 a28 a29 a30 a31 0 0 0 0 0 0 0 0 0 0 0 0 0 0 0 0 0 0 0 0 0 0 0 0 0 0 ) * b05 |
| a27 a28 a29 a30 a31 0 0 0 0 0 0 0 0 0 0 0 0 0 0 0 0 0 0 0 0 0 0 0 0 0 0 0 ) * b04 |
| a28 a29 a30 a31 0 0 0 0 0 0 0 0 0 0 0 0 0 0 0 0 0 0 0 0 0 0 0 0 0 0 0 0 ) * b03 |
| a29 a30 a31 0 0 0 0 0 0 0 0 0 0 0 0 0 0 0 0 0 0 0 0 0 0 0 0 0 0 0 0 0 ) * b02 |
| a30 a31 0 0 0 0 0 0 0 0 0 0 0 0 0 0 0 0 0 0 0 0 0 0 0 0 0 0 0 0 0 0 ) * b01 |
| a31 0 0 0 0 0 0 0 0 0 0 0 0 0 0 0 0 0 0 0 0 0 0 0 0 0 0 0 0 0 0 0 ) * b00 |

RESULT[0:31]

LOWER-ORDER 32 BITS OF MULTIPLICATION RESULT

FIG.9A
PRIOR ART

| TIME | Z | OR | Y |
|------|---|----|----|
| 00 | XXXXXXXXXXXXXXXXXXXXXXXXXXXX | XXXXXXXXXXXXXXXXXXXXXXXX | XXXXX |
| 01 | 0000000000000000000000000110 | 000000000000000000000000 | XXXXX |
| 02 | 0000000000000000000000000110 | 000000000000000010000101 | XXXXX |
| 03 | 0000000000000000000000000110 | 000000000000000010000101 | XXXXX |
| 04 | 0000000000000000000000000110 | 000000000000000000000101 | 00111 |
| 05 | 0000000000000000000000000110 | 000000000000000000000001 | 00010 |
| 06 | 0000000000000000000000000110 | 000000000000000000000000 | 00000 |
| 07 | 0000000000000000000000000110 | 000000000000000000000000 | 11111 |
| 08 | 0000000000000000000000000110 | 000000000000000000000000 | 11111 |

| FIG.9 | |
|---|---|
| FIG.9A | FIG.9B |

FIG.9B
PRIOR ART

| XL | XR | Q<br>ZRYXX<br>EEELE<br>EE |
|---|---|---|
| XXXXXXXXXXXXXXXXXXXXXXX | XXXXXXXXXXXXXXXXXXXXXXX | 10000 |
| XXXXXXXXXXXXXXXXXXXXXXX | XXXXXXXXXXXXXXXXXXXXXXX | 01000 |
| XXXXXXXXXXXXXXXXXXXXXXX | XXXXXXXXXXXXXXXXXXXXXXX | 00001 |
| XXXXXXXXXXXXXXXXXXXXXXX | 00000000000000000000000 | 01100 |
| XXXXXXXXXXXXXXXXXXXXXXX | 00000000000000000000000 | 01110 |
| 00000000000000000000110 | 00000000000000000000000 | 01111 |
| 00000000000000000000000 | 00000000000001100000000 | 01111 |
| 00000000000000000000000 | 00000000000001100011000 | 01111 |
| 00000000000000000000000 | 00000000000001100011110 | 00000 |
| 10000000000000000000000 | 00000000000000000000000 | |

FIG.11

| INPUT | OUTPUT |
|---|---|
| 00000 | 10000000000000000000000000000000 |
| 00001 | 11000000000000000000000000000000 |
| 00010 | 11100000000000000000000000000000 |
| 00011 | 11110000000000000000000000000000 |
| 00100 | 11111000000000000000000000000000 |
| 00101 | 11111100000000000000000000000000 |
| 00110 | 11111110000000000000000000000000 |
| 00111 | 11111111000000000000000000000000 |
| 01000 | 11111111100000000000000000000000 |
| 01001 | 11111111110000000000000000000000 |
| 01010 | 11111111111000000000000000000000 |
| 01011 | 11111111111100000000000000000000 |
| 01100 | 11111111111110000000000000000000 |
| 01101 | 11111111111111000000000000000000 |
| 01110 | 11111111111111100000000000000000 |
| 01111 | 11111111111111110000000000000000 |
| 10000 | 11111111111111111000000000000000 |
| 10001 | 11111111111111111100000000000000 |
| 10010 | 11111111111111111110000000000000 |
| 10011 | 11111111111111111111000000000000 |
| 10100 | 11111111111111111111100000000000 |
| 10101 | 11111111111111111111110000000000 |
| 10110 | 11111111111111111111111000000000 |
| 10111 | 11111111111111111111111100000000 |
| 11000 | 11111111111111111111111110000000 |
| 11001 | 11111111111111111111111111000000 |
| 11010 | 11111111111111111111111111100000 |
| 11011 | 11111111111111111111111111110000 |
| 11100 | 11111111111111111111111111111000 |
| 11101 | 11111111111111111111111111111100 |
| 11110 | 11111111111111111111111111111110 |
| 11111 | 11111111111111111111111111111111 |

MULTIPLIER DEVICE WITH OVERFLOW DETECTION FUNCTION

TECHNICAL FIELD

The present invention relates to a multiplier device for use in a microprocessor or a data processor, and, in particular, to multiplier device with a simple hardware configuration which can detect an overflow at high speed.

BACKGROUND ART

FIG. 1 is a configuration diagram for a conventional multiplier device 10. In the drawing, a reference character 1 is a 32-bit register (Y-register) for storing a multiplicand Y. A reference character 2 is a 32-bit register (X-register) for storing a multiplier X and also for storing the final result of a mathematical operation.

A reference character 3 is a 32-bit register (Z-register) for accumulated additions which stores operational results Z during a multiplication operation.

A reference character 4 is an ADDER which is a 32-bit adder for adding the contents Y and Z of the registers 1 and 3. A reference character 5 is a selector which outputs a field ADD<0:31> in the adder 4 as a output value when the bit X<31> in the register 2 is "1", or which outputs the contents Z<0:31> in the Z-register 3 when X<31> of the register 2 is "0".

The operation of a conventional multiplier device 10 with the above configuration shown in FIG. 1 will now be explained.

First, an output CARRY of the ADDER 4 is written into a Z<0> bit in the Z-register 3. At the same time, the bit field <0,30> in the X-register 2 is written into the bit field <1,31> in the X-register 2, and then the bit field SEL<0:30> in the output of the selector 5 is written into the Z<1:31> bit field in the Z-register 3; and the bit SEL<31> in the output from the selector 5 is written into the bit <0> in the X-register 2.

As a result, the contents of the bit field <1:30> of the X-register 2 are shifted one bit to the right.

The above operation will now be explained in detail using a timing chart shown in FIG. 2.

A multiplication 6×133=798 is being executed here. In the chart, TIME is the execution time; Y represents the contents of the Y-register 1 in which the multiplicand is stored; Z is the contents of the accumulated result by the adder 4, which is stored in the Z-register 3; and X is the contents of the multiplier stored in the X-register 2.

E1 designated at the right side in FIG. 2 is a control signal authorizing a write-in to the Y-register 1, When E1=1, the write-in is authorized; when E1=0 the value in the register Y is unchanged.

E2 designated at the right side in FIG. 2 is a control signal authorizing a write-in to the Z-register 3. When E2=1, the write-in is authorized; when E2=0 the contents of the Z-register 3 are unchanged.

E3 designated at right side in FIG. 2 is a control signal authorizing a write-in to the X-register 2. When E3=1, the write-in is authorized; when E3=0 the contents of the X-register 2 are unchanged.

For example, as shown in FIG. 2, when TIME=00, the contents of the X- and Y-registers 2 and 1, and Z are not set. E2 is set at 1.

When TIME=01, the value 0 is written into the Z-register 3.

Also, E1 is set at 1. When TIME=02, the multiplicand 6 (0000 . . . 0110) is written into the Y-register 1. E3 is then set at 1.

When TIME=03, the multiplier 133 (0000 . . . 010000101) is written into the X-register 2.

A multiplication instruction is executed from this time. During multiplication, E2 and E3 are set at 1. The value X<31> is 1, and the ADDER 4 adds the contents of the Y-register 1 and Z-register 3 and outputs the result (0000 . . . 0110) to the selector 5.

When TIME=04, the value SEL<0:30> in the output from the selector 5 which is the result of the addition by the ADDER 4 is written into the register Z<1:31>. Next, the value X<0,30> in the X-register 2 is shifted to the right by 1, and the value SEL<31> in the output from the selector 5 is written into the bit X<0> in the X-register 2

At this time X<31>=0, therefore a selector 5 outputs the value in the Z-register 3 without change.

This operation is repeated 32 times.

When TIME=35, the value 798 (0000 . . . 01100011110) which is the result of the multiplication is stored in the X-register 2.

The value stored in the Z-register 3 at this time is the upper order 32 bits of the multiplication result.

As explained above, a shifting operation is executed by the conventional multiplier device, for example as shown in FIG. 1, with this configuration, even when the value of the multiplier is 0, therefore many useless operations are performed. In other words it takes much time to execute multiplication by the conventional multiplier. This is a problem.

In the above-mentioned case, specifically, the execution of the operation is repeated 32 times, irrespective of the type of data, so that the execution takes a very long time.

Accordingly, a multiplier device 30 of the configuration shown in FIG. 3, for example, is commonly used conventionally to speed up the rate of execution.

In FIG. 3, QR is a 32-bit register 31 for storing a multiplier. PRE is a priority encoder 32 which searches the bits output from the QR-register 31 from the left, obtains the leading zero count, and outputs the inverted value of the bits in the bit row indicated by that number. The QR-register 31 has the function of clearing bits initially set at 1 among the bits searched by the priority encoder (PRE) 32.

In addition, the QR-register 31 has the function of detecting when the value in the QR-register 31 itself has become zero and outputting a signal QRZERO for externally transmitting this fact.

Y is a 5-bit register 33 for holding the output from the priority encoder PRE. Z is a 32-bit register 34 for storing a multiplicand. SHF is a shifter 35 for shifting the output from the Z-register 34 to the left by only the number of bits shown in the output from the Y-register 33.

XR is a 32-bit register 36 for storing the results of accumulated additions from multiplication operations.

ADDER is an adder 38 for adding the contents of the XR- and XL-registers 36 and 37.

The output from the adder (ADDER) 38 is output to the XR-register 37. An OR gate 39 has the function of performing an OR operation on a shift-out bit <0:31> output from the shifter (SHF) 35 and a CARRY signal output from the adder (ADDER) 38, and externally transmitting the generated overflow.

Next, the configuration of the QR-register 31 will be explained with reference to FIG. 4.

In the diagram, QREG is a 32-bit register 41. INV is an inverter 42 for inverting the value of a RESET signal PRE<0:4> output from the priority encoder (PRE) 32 shown in FIG. 3. MSKB is a mask generator 43 which sets a "0" for the value of a bit number indicated by the output of the inverter (INV) 42 only, and sets all other bits at "1". AND is an operation device 44 for executing an AND operation on the output from the QREG-register 41 and the MSKB<0,31> from the mask generator (MSKB) 43 per bit.

ZDET is a zero detection circuit 45 for detecting when the value of the QREG-register 41 is "0".

FIG. 5 is a truth table showing the operation of the mask generator (MSKB) 43 which is a structural element of the QR-register 31 shown in FIGS. 3 and 4.

First, a value indicating a bit number initially set at "1" is supplied as input to the mask generator (MSKB) 43 by the priority encoder (PRE) 32. As shown in the table in FIG. 5, only the bit number or value of the input is set to "0" in the output from the mask generator (MSKB) 43. For example, when the input value is "0001", the "0" is set in the 2nd bit position counted from the left side in the output value.

Next, an AND operation is executed for the mask generator MSKB and the QREG-register 41, and the result is rewritten into the QREG-register 41. The searched bits in the QREG-register 41 are therefore "0".

The operation of the priority encoder (PRE) 32 will now be explained with reference to FIG. 6.

First, the value shown as input is input to the priority encoder (PRE) 32. In the drawing, "X" may be either "0" or "1". These values are not set in the diagram. The priority encoder (PRE) 32 then searches the input from the left and outputs the inverse of the value in the bit number initially set as "1".

The priority encoder (PRE) 32 executes this operation in one cycle.

The operation of the shifter (SHF) 35 will now be explained with reference to FIG. 7. The shifter count is input to the shifter (SHF) 35. This shifter count is supplied from the Y-register 33. When the input of the shifter are set as d00, d11, ... d30, d31, the shifter (SHF) 35 shifts the input to the left according to the count, and, as shown in the diagram, the shifted result is output to the output column.

The number of bits equivalent to the shift count is set to "0" in the output on the right side.

The multiplication method for a conventional multiplier device 30 with the above-described configuration will now be explained with reference to FIGS. 8A and 8B.

The explanation will be given for a multiplication of a 32-bit integer. In the diagram, (a00, a01 . . . a30, a31) represent bits of a multiplicand, shown in binary, while (b00, b01 . . . b30, b31) represent bits of a multiplier, shown in binary. 32-bit numbers are input for the input values of the multiplicand and the multiplier.

Next, in the multiplication, the result of multiplying the multiplicand by b31, and the result of multiplying the next b30 by the result of shifting the multiplicand one bit to the left, are added together 32 times up to b00, to obtain the answer.

The addition result is obtained in 64 bits, but when the accumulated result register for these multiplications is a 32-bit register, only the lower order 32 bits of the multiplication result are stored in the accumulated result register. In this case, when "1"s are set in the upper order 32 bits of the multiplication result, an overflow error occurs.

In FIGS. 8A and 8B, executing a multiplication operation related to the bits with a value of "0" among the multipliers (b00 . . . b31) is an unnecessary operation. When the multiplier bit is "0", the result of multiplying this bit with the multiplicand is also "0", therefore accumulating the addition is unnecessary. Accordingly, if the multiplication operation were carried out only on multiplier bits which have an actual value, the number of clock cycles required for execution would be reduced.

Referring to FIGS. 9A and 9B, an example is given below of the multiplication of 6×133=798, using the multiplier device shown in FIG. 3. In these diagrams:

TIME indicates the execution time.

Z indicates the contents of the Z-register 34 for storing the multiplicand.

QR indicates the contents of the QR-register 31 for storing the multiplier.

Y is entered as the inverse of the leading zero count of the multiplier bits from the left.

XL is the result of the output of the shifter (SHF) 35. XR is the result of accumulated additions.

ZE is a signal authorizing the write-in of Z in the Z-register 34. When ZE=1, the write-in occurs; when ZE=0, the previous value is maintained for Z.

QRE is a signal authorizing the write-in of QR in the QR-register 31. When QRE=1, the write-in occurs; when QRE=0, the previous value is maintained for QR.

YE is a signal authorizing the write-in of Y in the Y-register 33. When YE=1, the write-in occurs; when YE=0, the previous value is maintained for Y.

XLE is a signal authorizing the write-in of XL in the XL-register 37. When XLE=1, the write-in occurs; when XLE=0, the previous value is maintained for XL.

XRE is a signal authorizing the write-in of XR in the XL-register 36. When XRE=1, the write-in occurs; when XRE=0, the previous value is maintained for XR.

The flow of the multiplication process will now be explained according to the time TIME shown in FIGS. 9A and 9B.

TIME=00: at this time, the contents of all of the registers 31, 33, 34, 37, and 36 are not set.

ZE is made 1.

TIME=01: the multiplicand 6 (0000 . . . 0110) is written into the Z-register 34. QRE=1.

TIME=02: the multiplier 133 (0000 . . . 10000101) is written into the QR-register 31. XRE=1.

TIME=03: the initial value 0 is written into an accumulation register TMPR. QRE=1, and the bits of the QR-register 31 which have been searched are reset. YE=1.

TIME=04: The content of the QR-register 31 is cleared. The bit number (00111) is written into RLT. QRE=1, and the bits of QR which have been searched are cleared. YE=1, and the bit number is written into YE. XLE=1, and Z is shifted by the count shown in Y and is written into XL.

TIME=05: the content in the QR-register 31 is cleared. The bit number (00111) is written into Y-register 33. QRE=1, and the bits of QR which have been searched are cleared.

The shifted result is written into XL-register 37. A multiplication instruction is executed at TIMES=05, 06, and 07. The shifter (SHF) 35, the priority encoder (PRE) 32, and the adder (ADDER) 38 are operated simultaneously.

During the multiplication, when the QR-register 31 becomes "0", a signal (QRZERO) indicating that the QR-register 31 is zero is set at "1" in the zero detection circuit (ZDET) 45, as shown in FIG. 4, in the QR-register 31. This means that the multiplication has been completed.

In this manner, in the conventional multiplier device, as shown in FIGS. 8A and 8B, if the multiplier bit 0 (b00) is "1", the priority encoder (PRE) 32 outputs (11111) (shown in FIG. 7). When (11111) is input, the shifter (SHF) 35 shifts (a00 . . . a31) 31 bits to the left (shown in FIGS. 8A and 8B). The shifted result is accumulated in the accumulation register (TMPR). If b00 is "0", no operation is performed on this bit. In the same manner, the priority encoder (PRE) 32 outputs the result according to FIG. 7, depending on the numbers of the bits for which the value is "1" during a search of (b00 . . . b31).

The shifter (SHF) 35 shifts the multiplicant according to FIG. 7, and multiplication is implemented by accumulating the addition of the results.

The detection of an overflow in a conventional multiplier device with the above-mentioned configuration and operation, converted to high speed, will now be explained.

In the case of a 32-bit×32-bit multiplication result, 64 bits are obtained. However, when the number of bits in the location where the result is stored is 32, an overflow error occurs if the multiplication result cannot be displayed in 32 bits.

It therefore becomes necessary to have a means for detecting this error.

In the case of the conventional multiplier device shown in FIG. 1, the upper order 32 bits of the multiplication result are stored in the Z-register and the lower order 32 bits are stored in the X-register. Therefore an overflow is produced in this multiplier device if even a single "1" exists in the bits of the Z-register after multiplication.

Specifically, the result of the multiplication of a 32-bit multiplicand and a 32-bit multiplier is obtained in 64 bits. However, when the location at which the result is stored has 32 bits, detection of an overflow error is necessary if the result cannot be displayed in 32 bits.

For example, with the conventional multiplier device shown in FIG. 1, the upper order 32 bits of the multiplication result are obtained in the Z-register and the lower order 32 bits are obtained in the X-register.

Therefore, the Z-register is examined after the multiplication operation, and, if not zero, an overflow occurs. In the case shown in FIG. 3, a detection means such as the one shown in FIG. 1 cannot be used because the multiplication result register has 32 bits.

In the case shown in FIG. 3, the following are considered as causes for the generation of an overflow.

(1) The case where the result cannot be displayed in 32 bits when the multiplicand is shifted.

Specifically, the case where a column overflow is produced by the shift operation (here, a shift-out is output from the shifter).

(2) The case where a shift output is produced when the result of shifting the multiplicand is accumulated. Then, with the conventional multiplier device shown in FIG. 3, the production of an overflow is detected by an OR operation between the above-mentioned shift-out bit output and a carry from the adder (ADDER).

In the conventional multiplier device with an overflow detection function illustrated in FIG. 3, a shift-out bit field <0:31> from the shifter (SHF) is supplied to one input of the OR-circuit. A carry bit from the adder (ADDER) is supplied to the other input of the OR-circuit.

The OR-circuit performs an OR operation on these two inputs and detects the production of an overflow. To explain this, with reference to FIGS. 8A and 8B, an overflow occurs if "result <0:31>" appears to the left of the part written in, specifically, if a "1" appears in the upper order 32 bits of the multiplication result.

In this detection method, when the following (1) or (2) occur, this means an overflow is generated.

(1) A "1" is present in the shift-out bit (the part shifted and overflowing to the left side).

(2) The carry output (column only) of the adder becomes "1" during accumulation addition.

As outlined above, with the conventional multiplier device shown in FIG. 1, the multiplication result is obtained in 64 bits.

Accordingly, an overflow is easily detected by examining the contents of the upper order 32 bits.

However, there is the drawback that considerable time is required for the multiplication process in this multiplier device.

As explained in the foregoing, with the conventional multiplier device, the area of the shifter is doubled to output a shift-out bit from the shifter. For this reason there is the problem that large-scale hardware is necessary.

In addition, the load on the shifter is increased and therefore there is the drawback that the operating speed of the shifter itself is reduced.

SUMMARY OF THE INVENTION

Accordingly, an object of the present invention is to provide, with due consideration to the drawbacks of such conventional devices, a multiplier device which can perform a multiplication at high speed without having the size of the hardware increased, and the overflow can be detected at high speed during multiplication.

A multiplier device with an overflow detection function according to a preferred embodiment of the present invention, comprises:

a multiplier register for storing a multiplier;

a multiplicand register for storing a multiplicand;

detection means for detecting a position of a first bit number "1" observed from the high order bit or from the low order bit in said multiplier register and for outputting a value output relating to the position of the first bit number "1";

shifting means for shifting the output from said multiplicand register in a specified direction according to a value output by said detection means;

an addition result register for storing a result of an addition;

addition means for adding the output from said shift means to the output from said addition result register in which the addition result is stored;

mask pattern generating means for outputting a predetermined mask pattern from a bit pattern output from said detection means;

logical product (AND) means for performing an AND operation on said mask pattern output from said mask pattern generating means and the value output from said multiplicand register; and logical add (OR) means for performing an OR operation between the output from said logical product (AND)

means and a carry component output from said addition means.

A multiplier device with an overflow detection function described above, further comprises shift result storage means provided between said shifting means and said addition means for temporarily storing the contents of said shifting means.

A multiplier device with an overflow detection function described above, further comprises detection result storage means provided between said detection means and said shifting means for temporarily storing the contents of said detection means.

A multiplier device with an overflow detection function according to another preferred embodiment of the present invention, comprises:

a multiplier register for storing a multiplier;

a multiplicand register for storing a multiplicand;

detection means for detecting a position of a first bit number "1" observed from the high order bit or from the low order bit in said multiplier register and for outputting a value output relating to the position of the first bit number "1";

detection result storage means for temporarily storing the contents of said detection means;

shifting means for shifting the output from the multiplicand register in a specified direction according to a value output by said detection means;

shift result storage means for temporarily storing the contents of said shifting means;

an addition result register for storing a result of an addition;

addition means for adding the output from said shift means to the output from said addition result register in which the addition result is stored;

mask pattern generating means for outputting a specified mask pattern from a bit pattern output from said detection means;

logical product (AND) means for performing an AND operation on the mask pattern output from said mask pattern generating means and the value output from said multiplicand register; and logical add (OR) means for performing an OR operation between the output from said logical product (AND) means and a carry component output from said addition means.

A multiplier device with an overflow detection function described above, wherein said detection device comprises a priority encoder, and said priority encoder searches the values output from said multiplier register from the left or the right to detect a bit initially set at "1", and outputs a value indicating that bit number.

A multiplier device with an overflow detection function described above, wherein said multiplier register comprises: second mask pattern generating means for outputting a pattern which differs from a specified pattern based on a value output by said detection means;

a multiplier storage register for storing a multiplier value; and multiplier AND operation means for performing an AND operation on said multiplier storage register and said second mask pattern generating means; and wherein said multiplier register has the function of detecting when the value in said multiplier storage register becomes zero.

BRIEF DESCRIPTION OF THE DRAWINGS

These and other objects, features, and advantages of the present invention will become more apparent from the following description of the preferred embodiments taken in conjunction with the accompanying drawings, in which:

FIG. 5 is a diagram for explaining the operation of the QR-register shown in FIG. 4.

FIG. 6 is a diagram for explaining the operation of a priority encoder (PRE) which is a structural element of the multiplier device of FIG. 3.

FIG. 7 is a diagram for explaining the operation of a shifter (SHF) which is a structural element of the multiplier device of FIG. 3.

FIGS. 8A and 8B are diagrams for explaining the principle of the multiplication operation of the multiplier device of FIG. 3.

FIGS. 9A and 9B are diagrams for explaining the operation of the multiplier device shown in FIG. 1.

FIG. 11 is a diagram for explaining the operation of a mask pattern generator (MSKA) which is a structural element of the multiplier device shown in FIG. 10.

DETAILED DESCRIPTION OF THE PREFERRED EMBODIMENTS

Other features of this invention will become apparent in the course of the following description of exemplary embodiments which are given for illustration of the invention and are not intended to be limiting thereof.

Before describing preferred embodiments of a multiplier devices according to the present invention basic conception of the present invention will be described.

In a multiplier device with an overflow detection function according to the present invention, a mask pattern with a specified bit pattern is output from the output value from a detection means (for example, a priority encoder).

An AND operation is then performed between this output and a multiplicand, and an OR operation is performed between this multiplication result and a carry output value from an adder. An overflow is therefore detected at high speed.

In addition, it is also possible to use an inverse mask pattern which is the inverse value of the above-mentioned mask pattern, for resetting the multiplier. This makes it possible to provide an overflow detector with a simple hardware configuration.

Next, a preferred embodiment of a multiplier device with an overflow detection function of the present invention will now be explained with reference to the drawings.

Figure 10:
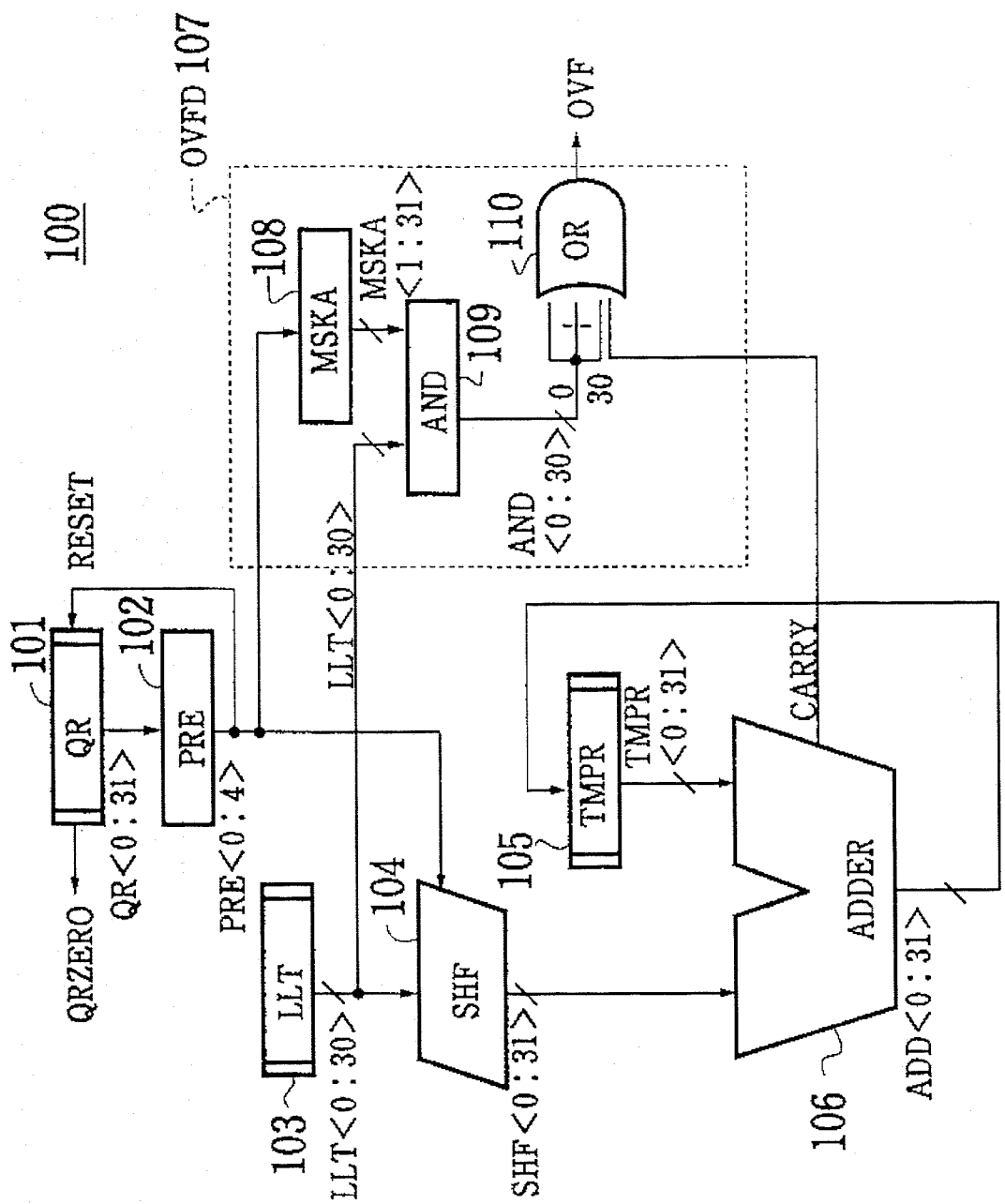
FIG. 10 is a configuration diagram of a first embodiment of a multiplier device with an overflow detection function of the Present invention.

FIG. 10 is a configuration diagram of a first embodiment of a multiplier device 100 of the present invention.

In this diagram, QR is a 32-bit register 101 for storing a multiplier. PRE is a priority encoder 102 which searches all bits output from the QR-register 101 to get a bit number of a bit initially set at 1, and outputs the inverted value of each bit in the bit row indicated by that number. The QR-register 101 has the function of resetting (to zero) the bit initially set at 1, found by the priority encoder (PRE) 102, using a reset signal RESET, output by the priority encoder (PRE) 102.

In addition, the QR-register 101 has the function of detecting the fact that the value in the QR-register 101 itself has become zero and outputting a signal QRZERO for transmitting this fact externally. LLT is a 32-bit register 103 for storing a multiplicand. SHF is a shifter 104 for shifting the contents of the LLT-register 103 to the left according to the number of bits output from the priority encoder (PRE) 102. TMPR is an accumulation register 105 for accumulating the output from an adder (ADDER) 106. The adder (ADDER) 106 adds the values output from the shifter (SHF) 104 to the values output from the accumulation TMPR-register 105 and stores the result in the accumulation TMPR-register 105.

In order to detect an overflow during a multiplication operation, the multiplier device 100 of the present invention is equipped with an overflow detector (OVFD) 107 comprising a mask generator (MSIA) 108, an AND-operator 109 for performing an AND operation on the contents of the LLT-register 103 and the output of the mask generator (MSKA) 108, and an OR-gate (OR) 110 for performing an OR operation on the output of the AND-operator 109 and the carry output from the adder (ADDER) 106.

FIG. 11 is a diagram illustrating the operation of the mask generator (MSIA) 108. In this diagram, the portion where "1" indicated in the output indicate the portion overflowing to the left side when the content of the mask generator (MSIA) 108 is shifted by the number indicated by the input.

An AND operation is performed by the AND-operator 109 between the mask pattern obtained from the mask generator (MSIA) 108 and each of the bits, which are the multiplicands, in the LLT-register 103. If even one "1" exists in the bit row obtained as the result, it is then known that a "1" exists in the shift-out bit row. In this manner, the occurrence of an overflow during multiplication can be detected by the overflow detection function of the multiplier device 100 of this embodiment by performing an OR operation between the output of the operator AND and the carry output from the adder (ADDER) 106.

When an overflow occurs during multiplication of the multiplier device 100, the value of an output OVF of the OR operation becomes "1".

If even one value of the output OVF during the execution of a multiplication instruction is "1", the generation of an overflow can be detected because the result of the operation cannot be expressed in 32 bits.

Figure 12:
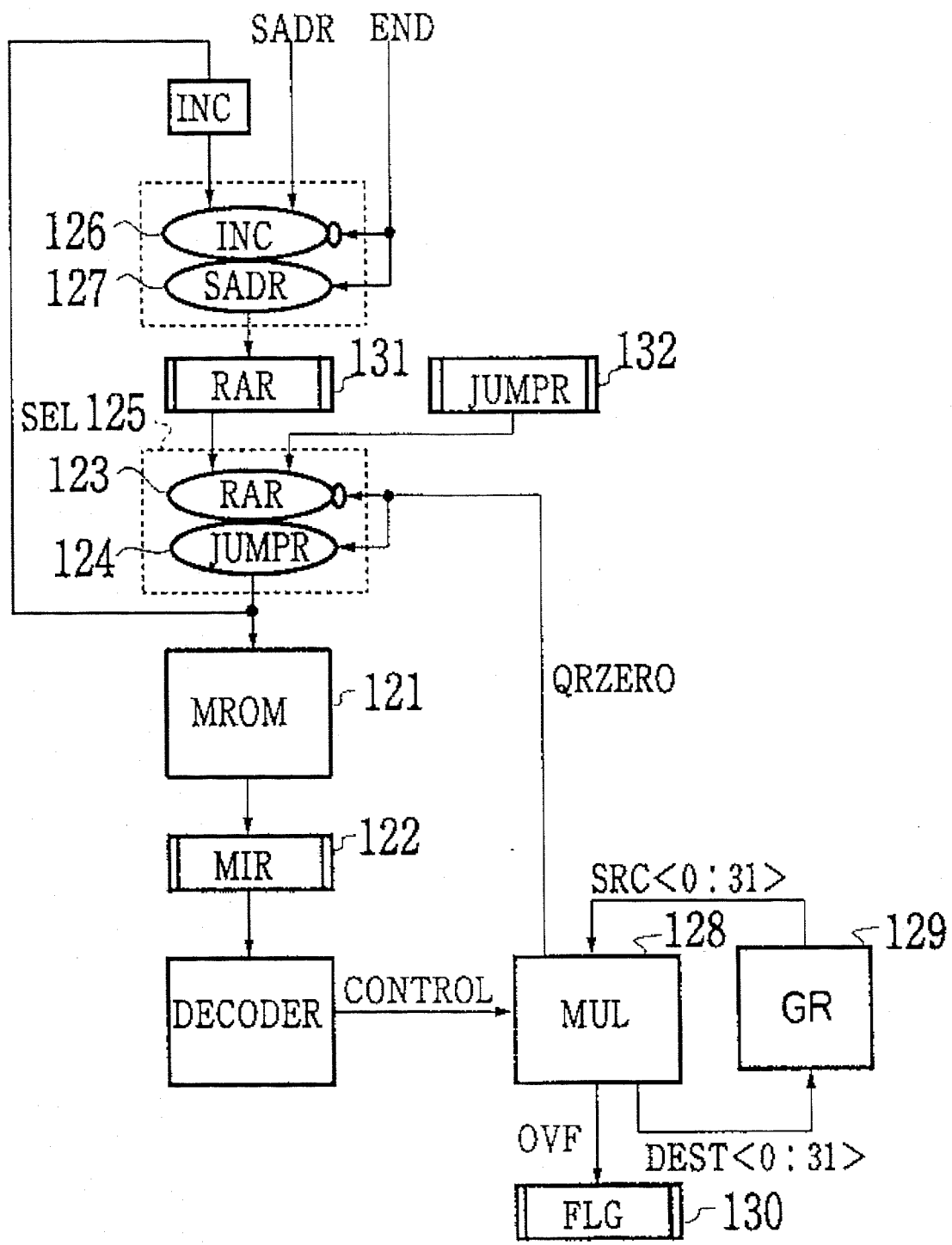
FIG. 12 is a configuration diagram for the multiplier device shown in FIG. 10 using a microprogram control method.

An example of the structure when microprogram control is provided for the multiplier device of the embodiment described above will now be explained with reference to FIG. 12.

In this diagram, MROM is a dedicated memory 121 from which a micro-instruction is read out of storage; MIR is a register 122 for holding the microinstruction read out of the MROM-memory 121; RAR is a register 123 for storing an address for the microinstruction; JUMPR is a register 124 for storing a branch address for the microinstruction; SEL is a selector 125 for supplying a choice between the RAR-register 123 and the JUMPR-register 124 to the MROM-memory 121; INC is an increment OR 126 for incrementing the address for the microinstruction; SADR is a signal for supplying the head address of a multiplication instruction, which is stored in the SADR-register 127; END is a signal for indicating that the execution of an instruction has been completed; MUL is a multiplier 128 for executing multiple operation; GR is a group of registers 129 for storing operation data or operation results; and FLG is a flag 130 for storing data such as an overflow or the like.

The operation of a multiplier device operated under the control of a microprogram with the above-described configuration will now be explained.

First, when the execution of the previous instruction is completed, the signal END becomes "1" and the address of the next instruction (multiplication instruction) is supplied to the SADR-register 127.

Next, the address of the multiplication instruction is written into the RAR-register 131, and the multiplication instructions from a group of microinstructions are read out from the MROM-memory 121 in sequence and executed. During the execution of a multiplication instruction, first, the multiplier and the multiplicand are written into the multiplier (MUL) 128 from the GR-registers 129. Then the incremented microinstruction addresses are written into the RAR-register 131 and executed in sequence.

When the QR-register 101 becomes "0" during the execution of the multiplication instruction and the operation is concluded, the signal QRZERO becomes "1" and the selector (SEL) 125 selects the JUMPR-register 124.

Next, the address of the program of the following process for the multiplication instruction is stored in the JUMPR-register 132. The multiplication result is written into the GR-registers 129 from the multiplier (MUL) 128.

Then, when an overflow occurs during the multiplication, the output OVF from the multiplier 128 becomes "1" and the fact that an overflow has been generated is written into the FLG-register 130.

A second embodiment of the multiplier device 150 according to the present invention will now be explained with reference to FIG. 13.

In the diagram, functional elements which are identical to those in the first embodiment of the present invention shown in FIG. 10 have the same functions.

Figure 13:
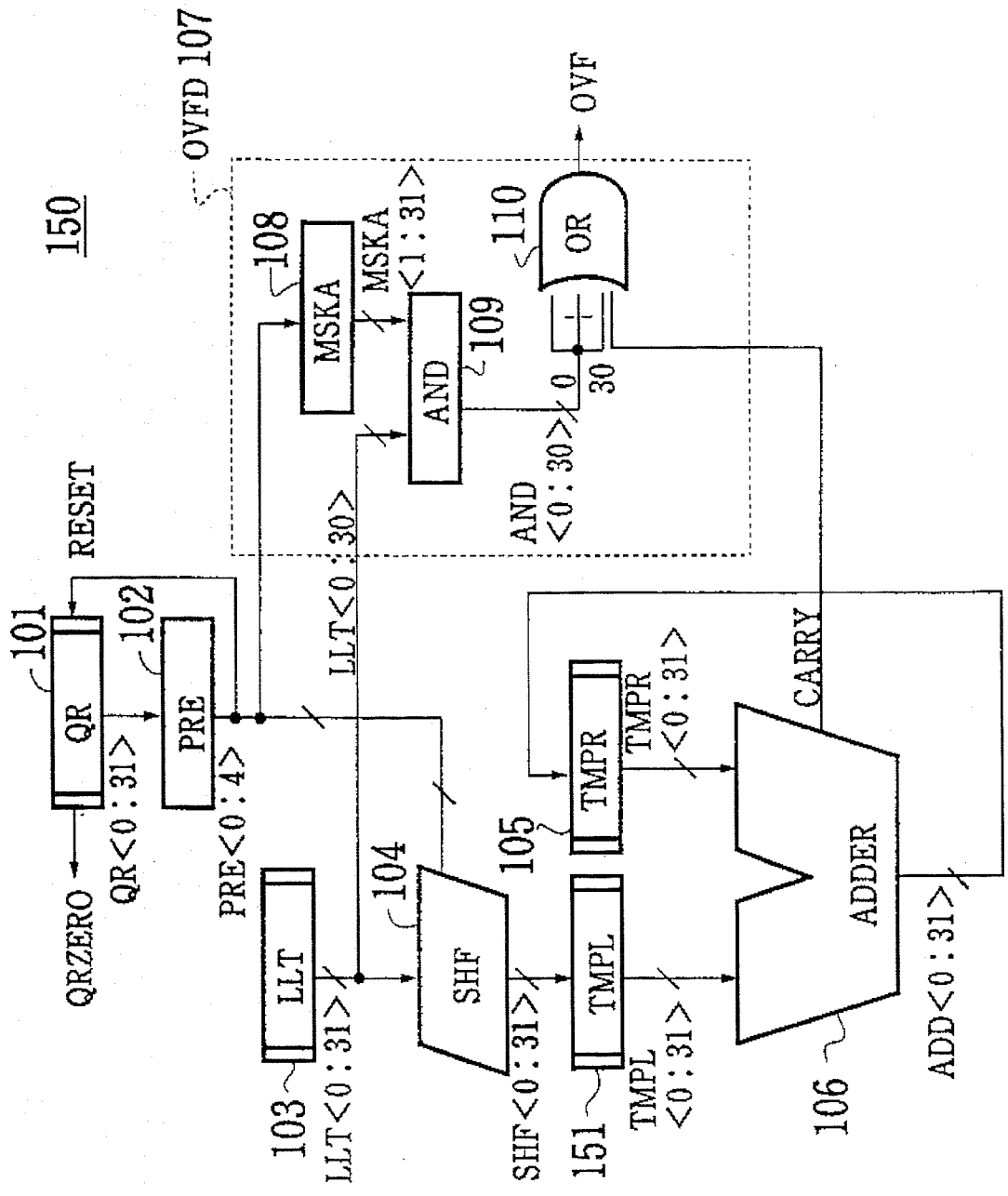
FIG. 13 is a configuration diagram of a second embodiment of a multiplier device with an overflow detection function of the present invention.

The difference between the first embodiment shown in FIG. 10 and the second embodiment shown in FIG. 13 is that a 32-bit register (TMPL) 151 for temporarily storing the output from the shifter (SHF) 104 is added between the shifter (SHF) 104 and the adder (ADDER) 106.

By adding the TMPL-register 151 in this manner it is possible to reduce the delay time in the signal route by which the signal passes through the shifter (SHF) 104 from the output of the priority encoder (PRE) 102, and enters the adder ADDER, so that the addition result is written into the accumulation register (TMPR) 105.

Figure 14:
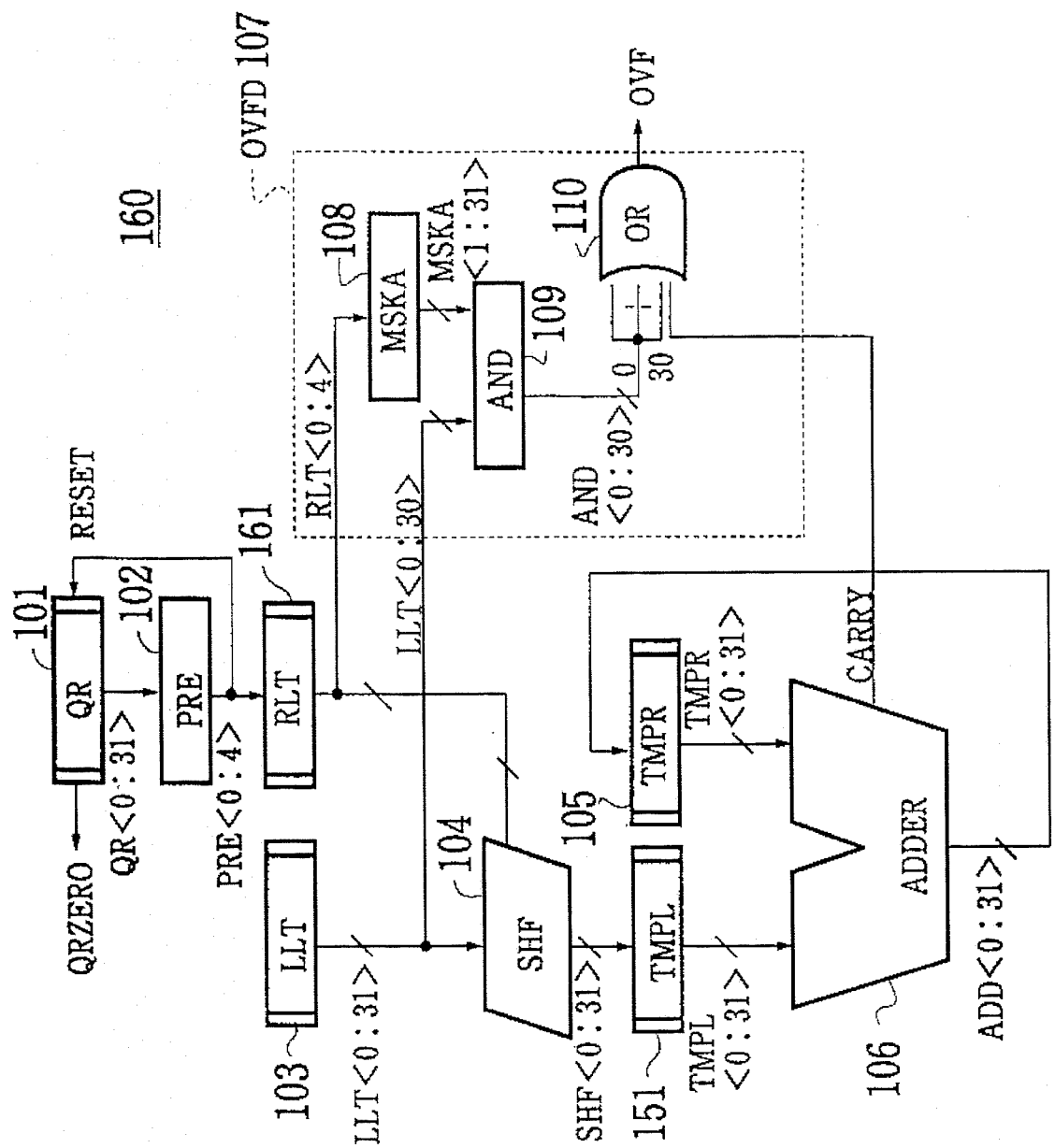
FIG. 14 is a configuration diagram of a third embodiment of a multiplier device with an overflow detection function of the present invention.

Next, a third embodiment of the present invention will be explained with reference to FIG. 14.

In this embodiment, functional elements which are identical to those in the second embodiment of the present invention shown in FIG. 13 have the same functions.

The difference between the embodiment of the multiplier device 160 according to the present invention shown in FIG. 13 and this embodiment is that a 5-bit register (RLT) for storing the output from the priority encoder (PRE) 102 is added between the priority encoder (PRE) 102 and the shifter (SHF) 104.

From this configuration, it is possible to separate the structural elements into suitable blocks and perform the various operations in different stages. For example, it is possible to use a pipeline operation so that the rate of execution of the addition operation is improved.

Figure 1:
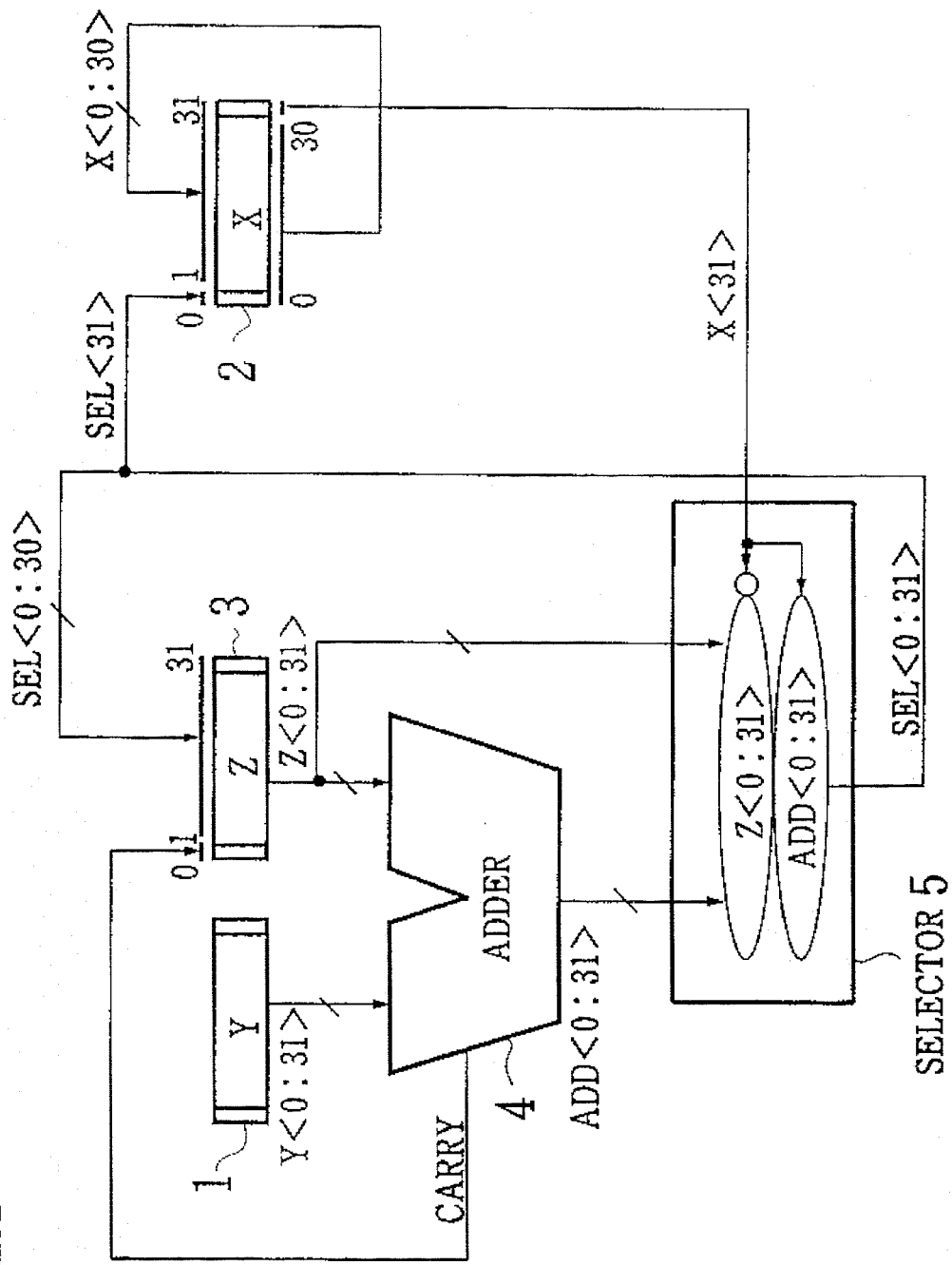
FIG. 1 is a basic configuration diagram of a conventional multiplier device.
Figure 2:
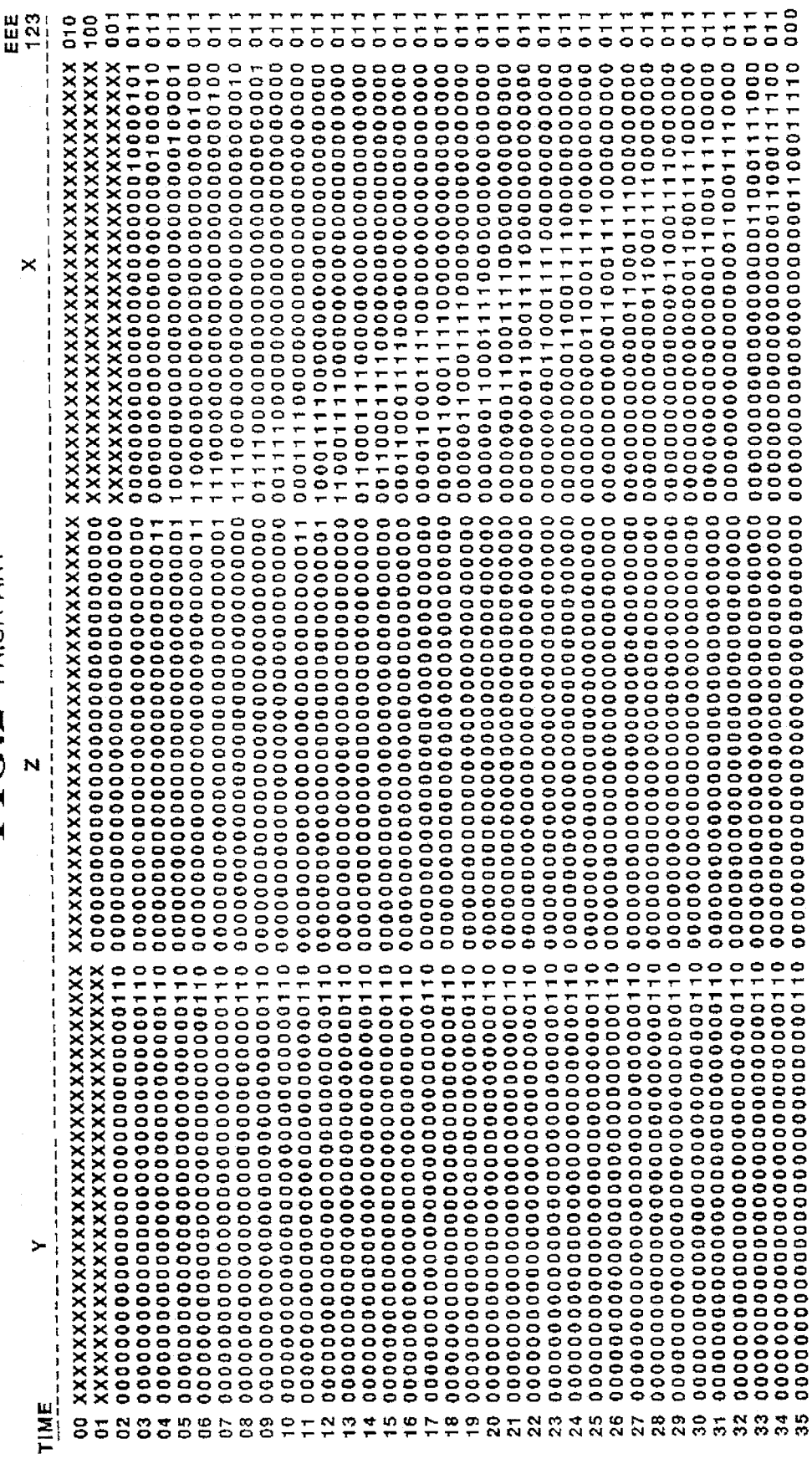
FIG. 2 is a diagram showing the contents of each register of the conventional multiplier device of FIG. 1.
Figure 3:
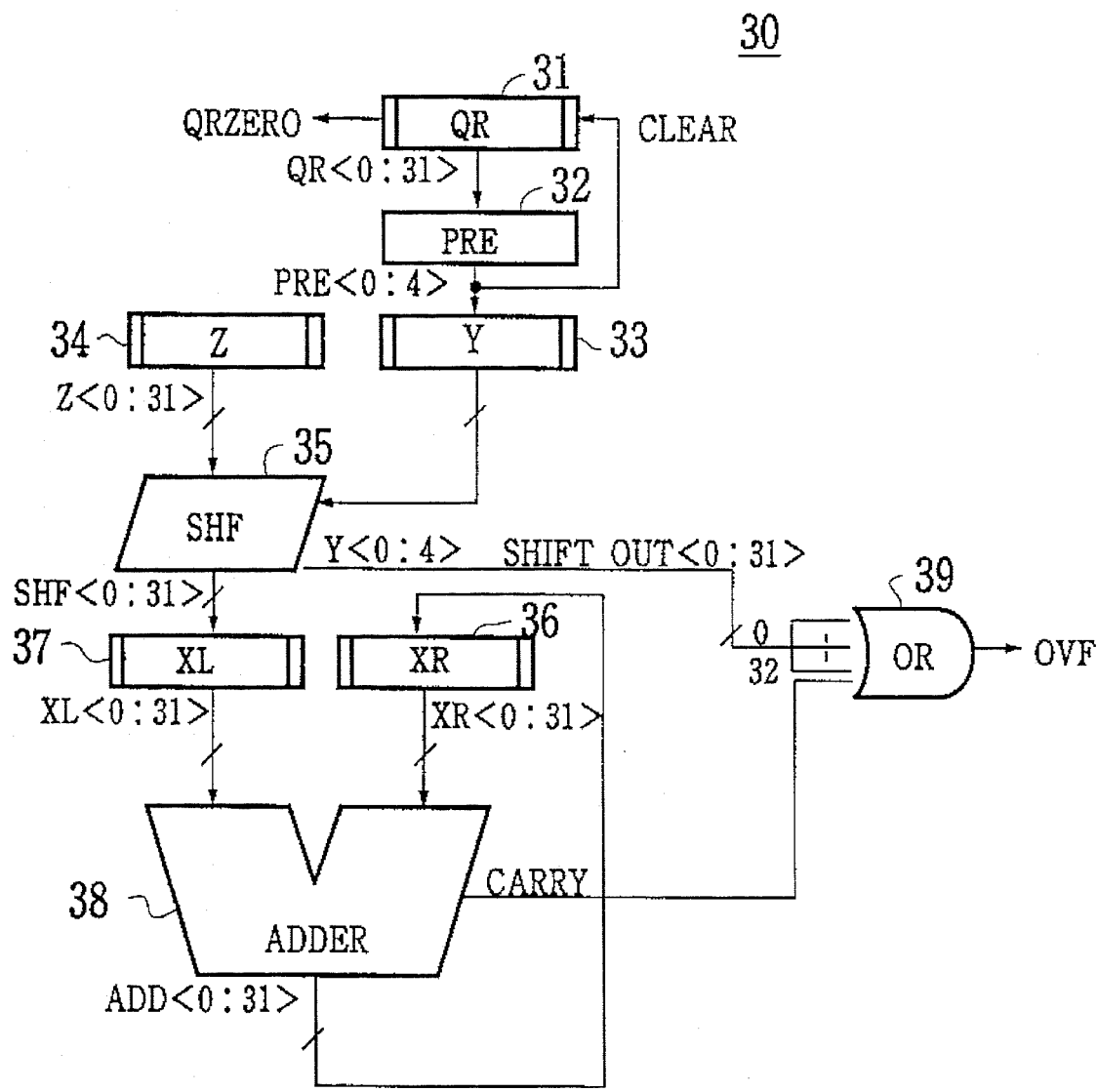
FIG. 3 is a configuration diagram of a multiplier device with a conventional overflow detection function.
Figure 4:
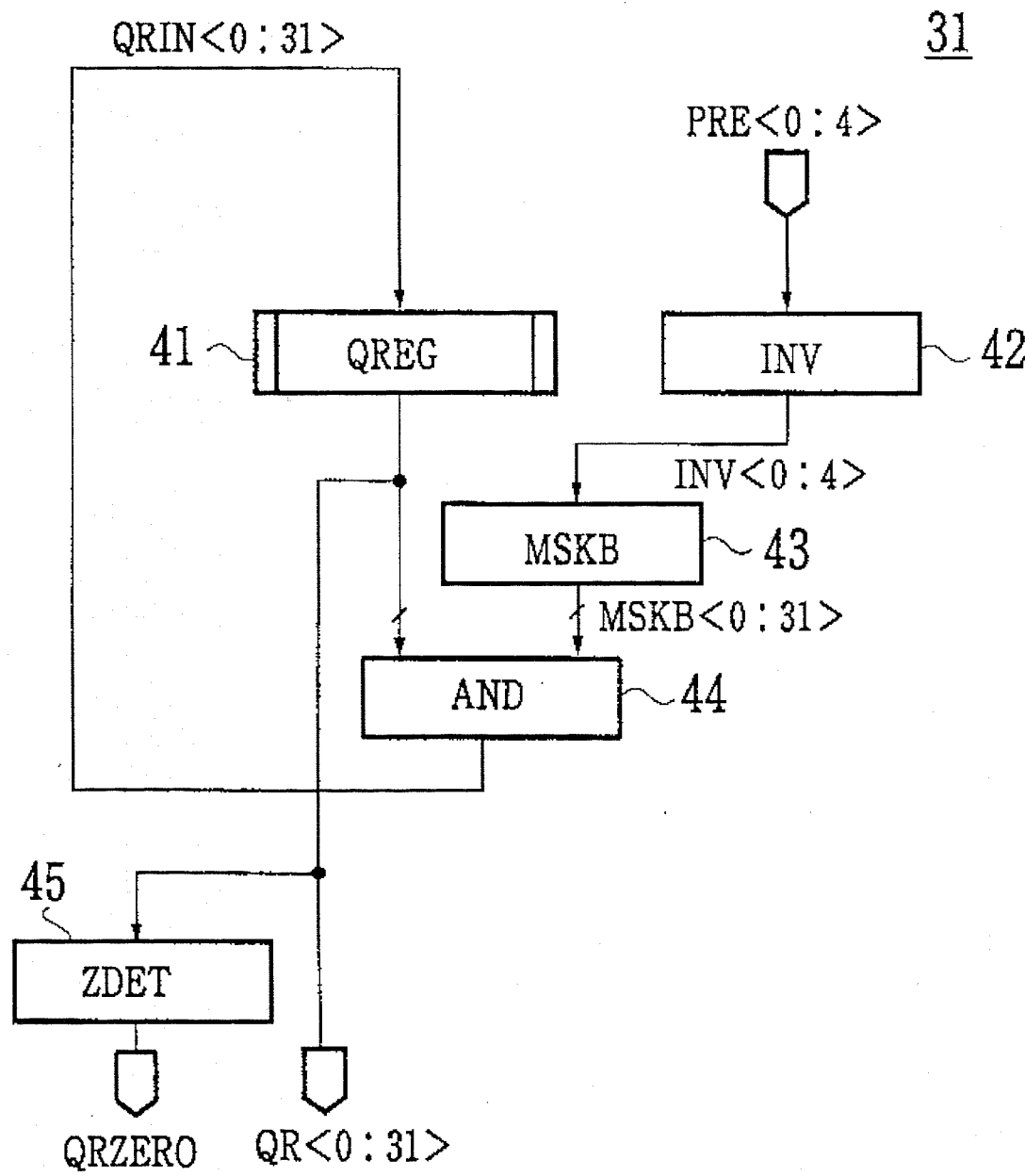
FIG. 4 is a configuration diagram of a QR-register for storing a multiplier, the QR-register being a structural element of the multiplier device of FIG. 3.

In the multiplier device 160 with an overflow detection function illustrated in FIG. 13, the mask pattern from the mask pattern generator (MSKB) 43, which is a structural element of the QR-register 31 shown in FIG. 4, can be output using the mask pattern output from the mask pattern generator (MSKA) 108.

Specifically, it is possible to prepare data for resetting the QR-register 101, using the output from the mask generator (MSIA) 108.

Figure 15:
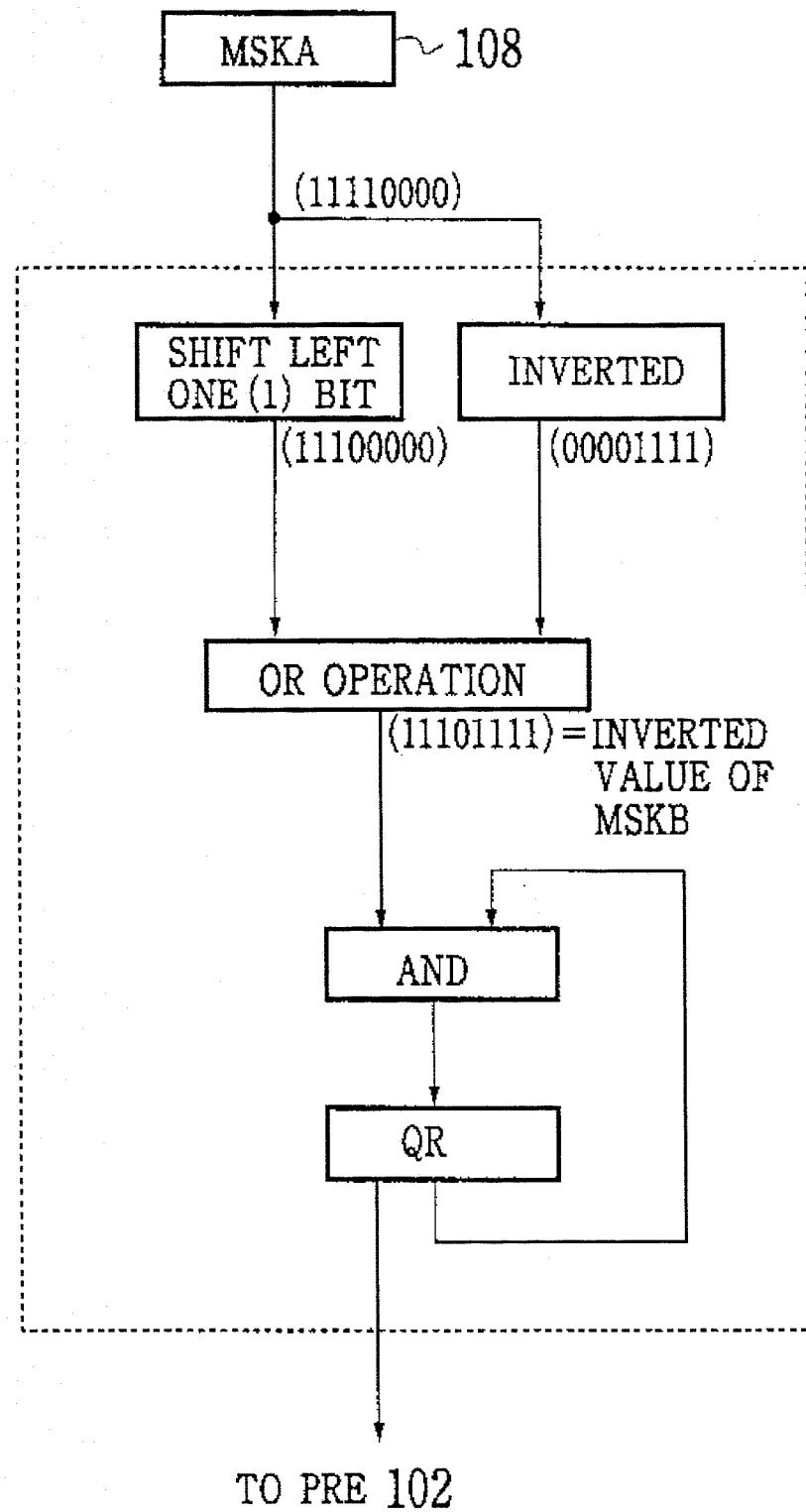
FIG. 15 is a configuration diagram of another embodiment of a mask pattern generator for the multiplier device of FIG. 10.

FIG. 15 shows an embodiment of a mask pattern generator which provides the above-mentioned function. In the diagram, a mask pattern (11110000) output from the mask pattern generator (MSKA) 108 has one bit shifted to the left, and an OR operation is performed between this value (11100000) and the inverted value (00001111). Because the value obtained by this operation (11101111) is the inverted value from the mask pattern generator (MSKB), it can be used as the input to the QR-register 101.

In this manner, using the mask pattern output from the mask pattern generator (MSKA) 108, the circuit of the mask pattern generator (MSKB) 108 can be used in common because the mask pattern of the mask pattern generator (MSKB) 108 shown in FIG. 4 can be easily prepared. As a result, the hardware requirements can be reduced.

As explained above in detail, with the multiplier device with an overflow detection function of the present invention, a mask pattern is generated from the output value of a priority encoder, an AND operation is performed with the multiplicand, an OR operation is performed between this result and a carry output from an adder, and the generation of an overflow is detected so that it is possible to detect overflow generation at high speed with a small hardware structure.

What is claimed is:

1. A multiplier device for performing a multiplication operation with an overflow detection function, comprising:

a multiplier register for storing a multiplier;

a multiplicand register for storing a multiplicand;

detection means for sequentially detecting a bit position of each binary "1" in the multiplier stored in said multiplier register and transmitting a position data relating to each detected binary "1" bit position by detecting a first binary "1" and transmitting corresponding position data, transmitting a reset signal for replacing the first binary "1" in the multiplier register with a binary "0", and repetitively detecting, transmitting and resetting until the content of the multiplier register becomes zero;

shift means for shifting the multiplicand stored in said multiplicand register toward a specified direction based on each position data transmitted from said detection means;

an addition result register for receiving an addition result as a result of an addition operation;

addition means for executing the addition operation between each shift result from each shift operation executed by said shift means and said addition result stored in said addition result register, transmitting each addition result to said addition result register, and generating a carry flag based on each addition result; and overflow detection means for receiving said multiplicand stored in said multiplicand register, said position data from said detection means, and said carry flag from said addition means, and detecting an occurrence of overflow, said overflow detection means including, mask pattern generating means for receiving said position data transmitted from said detection means and generating a mask pattern based on said position data;

logical AND means for receiving said mask pattern from said mask pattern generating means and said multiplicand stored in said multiplicand register, and executing an AND operation between said multiplicand and said mask pattern; and logical OR means for receiving a result of the AND operation and said carry flag transmitted from said addition means and generating an overflow signal to external devices, wherein said addition means repeats the addition operation until the content of the multiplier register becomes zero, said addition result stored in said addition result register being transmitted as a multiplication result to said external devices when the content of the multiplier register is equal to zero.

2. A multiplier device with an overflow detection function as claimed in claim 1, further comprising shift result storage means provided between said shift means and said addition means for temporarily storing said shift result executed by said shift means.

3. A multiplier device with an overflow detection function as claimed in claim 1, further comprising detection result storage means provided between said detection means and said shift means for temporarily storing said position data transmitted from said detection means.

4. A multiplier device with an overflow detection function as claimed in claim 1, wherein said detection means includes a priority encoder, and said priority encoder searches said multiplier stored in said multiplier register from one of a most significant bit (MSB) and a least significant bit (LSB) to detect the bit position of the first binary "1", and outputs a value indicating a bit number corresponding to the bit position of the first binary "1".

5. A multiplier device with an overflow detection function as claimed in claim 1, wherein said multiplier register comprises:

second mask pattern generating means for receiving said multiplier stored in said multiplier register, and generating and transmitting a position pattern to said detection means; and logical AND operation means for performing an AND operation between said multiplier stored in said multiplier register and said position pattern from said second mask pattern generating means, a result of the logical AND operation means being provided to said detection means.

6. A multiplier device for performing a multiplication operation with an overflow detection function, comprising:

a multiplier register for storing a multiplier;

a multiplicand register for storing a multiplicand;

detection means for sequentially detecting a bit position of each binary "1" in the multiplier register, transmitting position data relating to the bit position of each detected binary "1", and transmitting reset signals for replacing each binary "1" with a binary "0" until the content of the multiplier register becomes zero;

shift means for shifting the multiplicand stored in said multiplicand register toward a specified direction based on said position data transmitted from said detection means;

shift result storage means for temporarily storing a shift result of said shift means;

an addition result register for receiving an addition result as a result of an addition operation;

addition means for executing the addition operation between said shift result stored in said shift result storage means and said addition result stored in said addition result register, transmitting the addition result to said addition result register, and generating a carry flag based on the addition result of said addition operation; and overflow detection means for receiving said multiplicand stored in said multiplicand register, said position data from said detection means, and said carry flag from said addition means, and detecting an occurrence of overflow, said overflow detection means including, mask pattern generating means for receiving said position data transmitted from said detection means and generating a mask pattern based on said position data;

logical AND means for receiving said mask pattern from said mask pattern generating means and said multiplicand stored in said multiplicand register, and executing an AND operation between said multiplicand and said mask pattern; and logical OR means for receiving a result of the AND operation and said carry flag transmitted from said addition means and generating an overflow signal to external devices, wherein said addition means repeats the addition operation until the content of the multiplier register becomes zero, said addition result stored in said addition result register being transmitted as a multiplication result to said external devices when the content of the multiplier register is equal to zero.

7. A multiplier device with an overflow detection function as claimed in claim 6, wherein said detection means includes a priority encoder, and said priority encoder searches said multiplier stored in said multiplier register from one of a most significant bit (MSB) and a least significant bit (LSB) to detect the bit position of the first binary "1", and outputs a value indicating a bit number corresponding to the bit position of the first binary "1".

8. A multiplier device with an overflow detection function as claimed in claim 6, wherein said multiplier register comprises:

second mask pattern generating means for receiving said multiplier stored in said multiplier register, and generating and transmitting a position pattern to said detection means; and logical AND operation means for performing an AND operation between said multiplier stored in said multiplier register and said position pattern from said second mask pattern generating means and providing the result of said logical AND operation means to said detection means.

9. A multiplier device for performing a multiplication operation with an overflow detection function, comprising:

a multiplier register storing a multiplier;

a multiplicand register storing a multiplicand;

a detector connected to the multiplier register, the detector sequentially detecting a bit position of each binary "1" in the multiplier, transmitting a position data relating to each bit position, and transmitting a reset signal to replace each binary "1" with a binary "0" until the content of the multiplier register becomes zero;

a shifter connected to the multiplicand register, the shifter shifting the multiplicand based on the position data;

an addition result register storing an addition result;

an adder connected to the shifter and the addition result register, the adder performing an addition operation on a shift result from the shifter and the addition result stored in the addition result register, the adder transmitting the result of the addition operation to the addition result register for storage therein, the adder generating a carry flag based on the addition operation; and an overflow detector connected to the detector, the multiplicand register and the adder, the overflow detector receiving the multiplicand from the multiplicand register, the position data from the detector and the carry flag from the adder, the overflow detector detecting an occurrence of an overflow based on the multiplicand, position data and carry flag, wherein the adder repeats the addition operation until the content of the multiplier register becomes zero, at which time the addition result stored in the addition result register is the result of the multiplication operation.

10. A multiplier device as recited in claim 9, wherein the overflow detector comprises:

a mask pattern generator connected to the detector, the mask pattern generator receiving the position data from the detector and generating a mask pattern based thereon;

a logical AND gate connected to the mask pattern generator and the multiplicand register, the logical AND gate performing an AND operation on the multiplicand and the mask pattern; and a logical OR gate connected to the logical AND gate and the adder, the logical OR gate performing an OR operation on the result of the AND operation and the carry flag, the logical OR gate producing an overflow signal indicating the occurrence of an overflow as a result of the OR operation.

11. A multiplier device as recited in claim 10, further comprising a detection result storage unit connected between the detector and the shifter, the detection result storage unit temporarily storing the position data.

12. A multiplier device as recited in claim 10, further comprising a shift result storage unit connected to the shifter, the shift result storage unit temporarily storing the shift result.

13. A multiplier device as recited in claim 10, wherein the detector comprises a priority encoder which searches the multiplier from one of a most significant bit (MSB) and a least significant bit (LSB) to detect the bit position of the first binary "1", the priority encoder further outputting a value indicating a bit number corresponding to the bit position of the first binary "1".

14. A multiplier device as recited in claim 10, wherein said multiplier register comprises:

a second mask pattern generator which receives the multiplier and generates a position pattern which it transmits to the detector; and a logical AND operation unit connected to the second mask pattern generator, the logical AND operation unit performing an AND operation on the multiplier and the position pattern and providing the result of the AND operation from the logical AND operation unit to the detector.

* * * * *